(12) United States Patent
Huth

(10) Patent No.: US 12,546,128 B2
(45) Date of Patent: Feb. 10, 2026

(54) METHOD, CONTROL DEVICE, SYSTEM, CONCRETE PLACEMENT BOOM AND COMPUTER PROGRAM FOR CONTROLLING THE MOVEMENT OF AN END TUBE

(71) Applicant: Putzmeister Engineering GmbH, Aichtal (DE)

(72) Inventor: Tobias Huth, Stuttgart (DE)

(73) Assignee: Putzmeister Engineering GmbH, Aichtal (DE)

( * ) Notice: Subject to any disclaimer, the term of this patent is extended or adjusted under 35 U.S.C. 154(b) by 326 days.

(21) Appl. No.: 17/774,693

(22) PCT Filed: Oct. 26, 2020

(86) PCT No.: PCT/EP2020/080002
§ 371 (c)(1),
(2) Date: May 5, 2022

(87) PCT Pub. No.: WO2021/089352
PCT Pub. Date: May 14, 2021

(65) Prior Publication Data
US 2022/0396956 A1 Dec. 15, 2022

(30) Foreign Application Priority Data
Nov. 5, 2019 (DE) ..................... 10 2019 129 810.5

(51) Int. Cl.
*E04G 21/04* (2006.01)

(52) U.S. Cl.
CPC ..... *E04G 21/0463* (2013.01); *E04G 21/0436* (2013.01)

(58) Field of Classification Search
CPC . E04G 21/0463; E04G 21/0436; B28B 1/001; B28B 17/0081; B28B 17/008
See application file for complete search history.

(56) References Cited

U.S. PATENT DOCUMENTS 4,621,375 A * 11/1986 Simnovec .............. G08C 17/00
455/352
5,823,218 A 10/1998 Schlecht et al.
(Continued)

FOREIGN PATENT DOCUMENTS

CN 109072578 A 12/2018
DE 102013012370 A1 1/2015
(Continued)

OTHER PUBLICATIONS

PCT International Preliminary Report on Patentability for International application No. PCT/EP2020/080002 filed on Oct. 26, 2020; Date of Issuance: May 10, 2022; 14 pgs.
(Continued)

*Primary Examiner* — Jelani A Smith
*Assistant Examiner* — Paul A Castro
(74) *Attorney, Agent, or Firm* — Alix, Yale & Ristas, LLP

(57) ABSTRACT

The invention relates to a method for controlling the movement of an end hose arranged on a concrete placement boom of a concrete pump with a display device arranged in the region of the end hose by means of a control device, comprising the following steps: outputting a signal for displaying a predefined movement direction to the display device; receiving a predefined speed for moving the end hose from an actuation device; and calculating and outputting control signals for controlling the concrete placement boom in such a way that the end hose is moved in the predefined movement direction at the predefined speed. The invention also relates to a corresponding control device, a system, a concrete placement boom and a computer program for controlling the movement of an end hose arranged on a concrete placement boom of a concrete pump.

21 Claims, 5 Drawing Sheets

(56) References Cited

U.S. PATENT DOCUMENTS

| | | | |
|---|---|---|---|
| 7,302,288 B1 | 11/2007 | Schellenberg | |
| 11,098,491 B2* | 8/2021 | Henikl | E04G 21/0463 |
| 2003/0226290 A1 | 12/2003 | Savard et al. | |
| 2008/0162005 A1* | 7/2008 | Tang | E04G 21/04 |
| | | | 701/50 |
| 2016/0185359 A1* | 6/2016 | Mayer | B60W 50/14 |
| | | | 701/2 |
| 2020/0392746 A1* | 12/2020 | Bertram | B25J 9/1689 |

FOREIGN PATENT DOCUMENTS

| | | |
|---|---|---|
| DE | 102015108473 A1 | 12/2016 |
| DE | 102016125145 A1 | 6/2018 |
| JP | 2013091933 A | 5/2013 |
| JP | 2019108749 A | 7/2019 |
| KR | 1020110093494 A | 8/2011 |
| WO | 2009109017 A1 | 9/2009 |

OTHER PUBLICATIONS

PCT International Search Report and Written Opinion for PCT/EP2020/080002 filed Oct. 26, 2020, Date of Mailing: Feb. 2, 2021; 12 pgs.

\* cited by examiner

METHOD, CONTROL DEVICE, SYSTEM, CONCRETE PLACEMENT BOOM AND COMPUTER PROGRAM FOR CONTROLLING THE MOVEMENT OF AN END TUBE

BACKGROUND

The invention relates to a method for controlling the movement of an end tube arranged on a concrete placement boom of a concrete pump having a display device arranged in the region of the end tube by means of a control device. The invention furthermore relates to a corresponding control device, a system, a concrete placement boom, and a computer program for controlling the movement of an end tube.

Concrete placement booms consist of at least two boom arms connected to one another in an articulated manner via a pivot axis and can be designed as part of a stationary or mobile concrete pump. To discharge the concrete at a desired point, for example on a construction site, the boom arms carry a concrete delivery line and can be positioned by pivoting in such a way that different locations are reachable by the concrete placement boom. In addition, the concrete delivery line opens at the boom tip into a usually flexible end tube.

Various types of control are known for positioning the end tube. Using such assistance systems, the end tube can be moved, for example, in such a way that it moves in the radial direction with respect to the central slewing gear of the concrete pump or rotates together with the entire placement boom at constant radius around the slewing gear. It is also possible to control an upward or downward movement of the end tube by a movement in the direction of the axis of rotation. A control of the end tube along a straight line, the extension of which does not intersect the slewing gear, is only possible by superimposing multiple movements and can only be carried out by experienced operators.

SUMMARY

The object of the present invention is therefore to present a method and a control device for controlling the movement of an end tube, in which the disadvantages known from the prior art are avoided or at least reduced.

The invention relates to a method for controlling the movement of an end tube arranged on a concrete placement boom using a display device arranged in the region of the end tube having the following steps: outputting a signal to display a predetermined direction of movement on the display device, receiving a predetermined speed for the movement of the end tube from an actuating device, and calculating and outputting control signals to control the concrete placement boom in such a way that the end tube moves at the predetermined speed in the predetermined direction of movement.

The invention furthermore relates to a control device for moving an end tube arranged on a concrete placement boom using a display device arranged in the region of the end tube, wherein the control device is configured in particular to carry out the steps of the method according to the invention, and wherein the control device is designed to output a signal to display a predetermined direction of movement on the display device, to receive a predetermined speed for the movement of the end tube from an actuating device, and to calculate and output control signals to control the concrete placement boom in accordance with a movement of the end tube at the predetermined speed in the predetermined direction of movement.

The invention is based on the finding that an operator generally cannot accurately know the alignment at the tool center point (TCP) in the region of the end tube, which makes it more difficult to control the end tube movement. A simplified option for controlling the end tube movement is thus provided by the display device arranged in the region of the end tube, which can also be executed by a less experienced operator. The display device displays a predetermined direction of movement for this purpose, which is visible to the operator during the control of the end tube movement. The predetermined direction of movement can either be programmed into the display device or established or changed via an operator. The movement direction can be independent of the position of the placement boom or the conditions of the construction site. The operator therefore solely has to set a speed at which the end tube is to move in the predetermined direction of movement. Subsequently, the driving commands of the operator are converted into driving commands for the joints of the placement boom in such a way that the end tube moves at the predetermined speed in the predetermined direction of movement. For this purpose, control signals for the concrete placement boom are calculated and output based on the values for the predetermined direction of movement and the predetermined speed.

The concrete placement boom can be designed as part of a mobile or stationary concrete pump.

The end tube can be moved in a straight line, in particular along an arbitrary straight line, the extension of which does not extend through the central pivot point of the placement boom. Standard contours can be traveled by the linear movement—independently of the setup location of the concrete pump.

The operator can set a predetermined speed of the end tube movement via the actuating device. A signal corresponding to a negative speed can also be specified via the actuating device, which results in a movement of the end tube against the predetermined direction of movement. This function enables a simple retraction of the end tube without complex control steps or changing the movement direction.

Using the additional method steps: receiving a signal in accordance with a changed movement direction from the actuating device and transmitting a signal to adapt the predetermined direction of movement to the display device, the predetermined direction of movement can be changed. The adapted movement direction can be displayed nearly instantaneously via the display device and changed until it corresponds to the desired movement direction.

The predetermined direction of movement can correspond to an x and y direction of a Cartesian coordinate system, in which the end tube is located in the coordinate origin of the Cartesian coordinate system, and the predetermined speed can correspond to a movement direction in the x and/or y direction. In this case, the display device displays both the x axis and also the y axis of the Cartesian coordinate system instead of a predetermined direction of movement. These axes can be aligned once on the construction site, for example. The orthogonal coordinate system in two-dimensional space enables a rapid orientation for the operator.

The control device can be designed so that the predetermined direction of movement and the predetermined speed or the x and y direction and the predetermined direction of movement in the x and/or y direction are converted into control signals for at least one articulated drive of the concrete placement boom. For this purpose, the control device can furthermore be designed to communicate with an angle encoder of an articulated drive of the concrete placement boom. That is to say, items of information about the angles of the articulated joints can be read out via the angle encoders. The control device preferably communicates with each angle encoder of an articulated drive or boom arm of the concrete placement boom.

A system comprising a corresponding control device, a display device, and an actuating device is preferably used to control the end tube movement. The control device is designed for this purpose so that it transmits signals to the display device with respect to the predetermined direction of movement and receives signals from the actuating device with respect to a predetermined speed. The predetermined direction of movement can be displayed directly via the display device arranged in the region of the end tube. The predetermined speed can be set directly by the operator via the actuating device.

The display device can be arranged as a physical device on the end tube or can be projected with computer assistance in the field of view of an operator. In addition to the movement direction, the display device can display a further direction of opposite movement direction (reverse direction). An operator can thus recognize the display device from any viewing angle—also from the rear. In Cartesian coordinates, this means that in addition to the x and y directions, the −x and −y directions can also be displayed.

The display device can be designed as a mechanical pointer or as an electronic display device, preferably as an LED ring. The mechanical pointer can, driven mechanically, always point in the predetermined direction of movement and can be attached to the end tube similarly to the end tube pinch valve, which can close the end tube. The LED ring can have a plurality of revolving light sources distributed around its circumference, which light up and thus display the predetermined direction. Alternatively, the LED ring can be designed so that, for example, the color "green" displays the forward direction (front) and the color "red" displays the reverse direction (rear).

The actuating device can be designed as a remote control, for example as a radio remote control. This enables the operator to control the movement of the end tube from any point of the construction site. In particular, it is not necessary to stay in the immediate vicinity of the end tube or possibly the control device.

The actuating device can comprise a first operating element, wherein the predetermined speed and/or the predetermined direction of movement is set via the first operating element. The speed and the movement direction can be set step-by-step in accordance with predetermined intervals or continuously. A deflection of the operating element in or against the predetermined direction of movement can result in a travel movement of the end tube. A deflection of the operating element perpendicular to the predetermined direction of movement can result in a steering movement (cylinder coordinates) or a movement perpendicular to the predetermined direction of movement (Cartesian coordinates). The actuating device can alternatively comprise a first and second operating element, wherein the predetermined direction of movement is set or changed via the first operating element and the predetermined speed is set or changed via the second operating element. The control can be designed as a proportional, continuously variable two-channel remote control (one channel for the speed, one channel for the direction).

Alternatively, the actuating device can comprise an operating element, wherein the movement direction is settable in the x and/or y direction via the operating element, or an actuating device can comprise a first and second operating element, in which the movement direction in the x or y direction is settable via the first or second operating element, respectively.

One or more of the operating elements can be designed as a joystick.

The invention furthermore relates to a concrete placement boom having a corresponding control device or a corresponding system comprising a control device.

The invention furthermore relates to a computer program having program code means for controlling the movement of an end tube arranged on a concrete placement boom of a concrete pump to carry out all steps of the method according to the invention when the computer program is executed on a suitable processing device, in particular a control device according to the invention. The present description also covers a computer program having program code which is capable of executing a method according to the invention when the computer program runs on a suitable processing device, for example, a control device. Both the computer program itself and also it stored on a computer-readable medium (computer program product) are claimed.

The method according to the invention can be refined by further features described in conjunction with the control device according to the invention. The control device according to the invention can be refined by further features described in conjunction with the method according to the invention.

BRIEF DESCRIPTION OF THE DRAWINGS

The invention is described by way of example hereinafter on the basis of advantageous embodiments with reference to the appended drawings. In the figures.

DETAILED DESCRIPTION

Figure 1A:
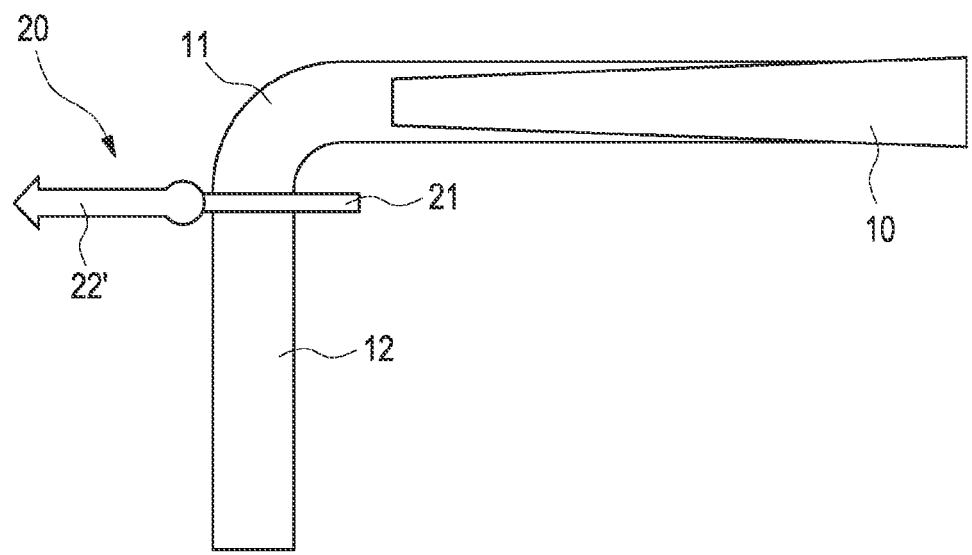
FIG. 1: shows a schematic view of an end tube arranged on a concrete placement boom having a mechanical display device according to a first embodiment a) in a side view and b) in a top view.
Figure 1B:
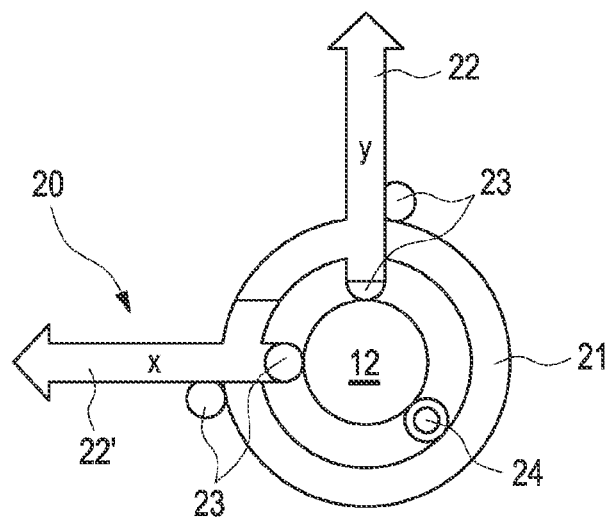

FIG. 1 shows a boom tip of a (concrete) placement boom 10 of a concrete pump. The part of the placement boom 10 shown in the figure is the last boom arm. A concrete delivery line 11 is guided on the placement boom 10, which opens into a flexible end tube 12. In a region in which the delivery line 11 in the form of a curved pipe connector merges into the end tube 12, a display device 20 is arranged. The display device 20 is designed as a mechanical display device. The display device 20 comprises in this embodiment two display elements 22, 22', of which a first display element 22 points in a y direction of a Cartesian coordinate system and a second display element 22 points in an x direction of the Cartesian coordinate system. The x direction (display element 22') is the predetermined direction of movement. The display elements 22, 22' are part of a revolving ring 21, the alignment of which can be set via drives 23 and the alignment of which can be read out by a sensor 24. If the predetermined direction of movement (alignment of display element 22') is to be changed, the entire ring including display elements 22, 22' is rotated.

Figure 2:
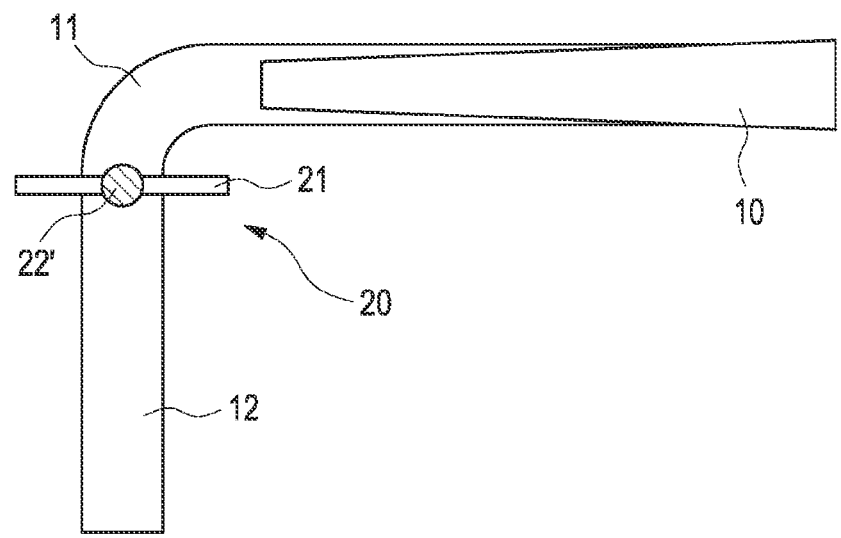
FIG. 2: shows a schematic view of an end tube arranged on a concrete placement boom having a display device in an alternative embodiment a) in a side view and b) in a top view.
Figure 2:
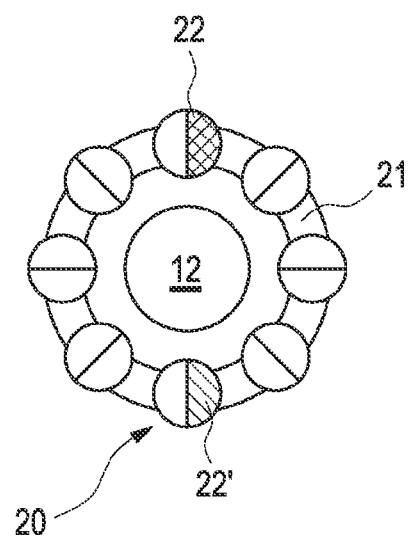

In the alternative embodiment shown in FIG. 2, the display device 20 is designed as an LED ring. For this purpose, the ring 21 has at least eight revolving display elements in the form of light sources distributed around its circumference. In the illustrated embodiment, the individual light sources can each light up "red" or "green". The green-light LED is aligned along the predetermined direction of movement (display element 22') and accordingly points in the forward direction, while the red-light LED is aligned against the predetermined direction of movement (display element 22) and accordingly points to the rear. The use of eight display means enables the setting of the predetermined direction of movement by 45° exactly. The more light sources are used, the more exactly can the predetermined movement direction be set.

Figure 3:
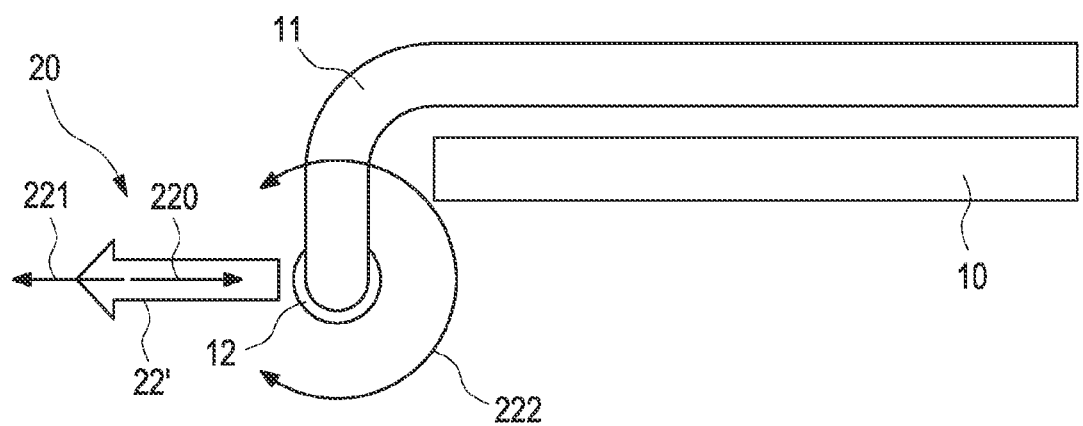
FIG. 3: shows a schematic view of the movement options of an end tube arranged on a concrete placement boom.

In the embodiment shown in FIG. 3, only the predetermined direction of movement is displayed by the display device 20 in the form of display element 22'. Via an actuating element (not shown), the end tube 12 can be moved along or against the predetermined direction of movement (along the arrow directions 221 and 220). Moreover, the predetermined direction of movement can be changed by a rotational movement along the arrow direction 222 and thus the forward or reverse direction can be aligned differently. The position of the end tube 12 is also referred to as the "tool center point" (TCP).

Figure 4:
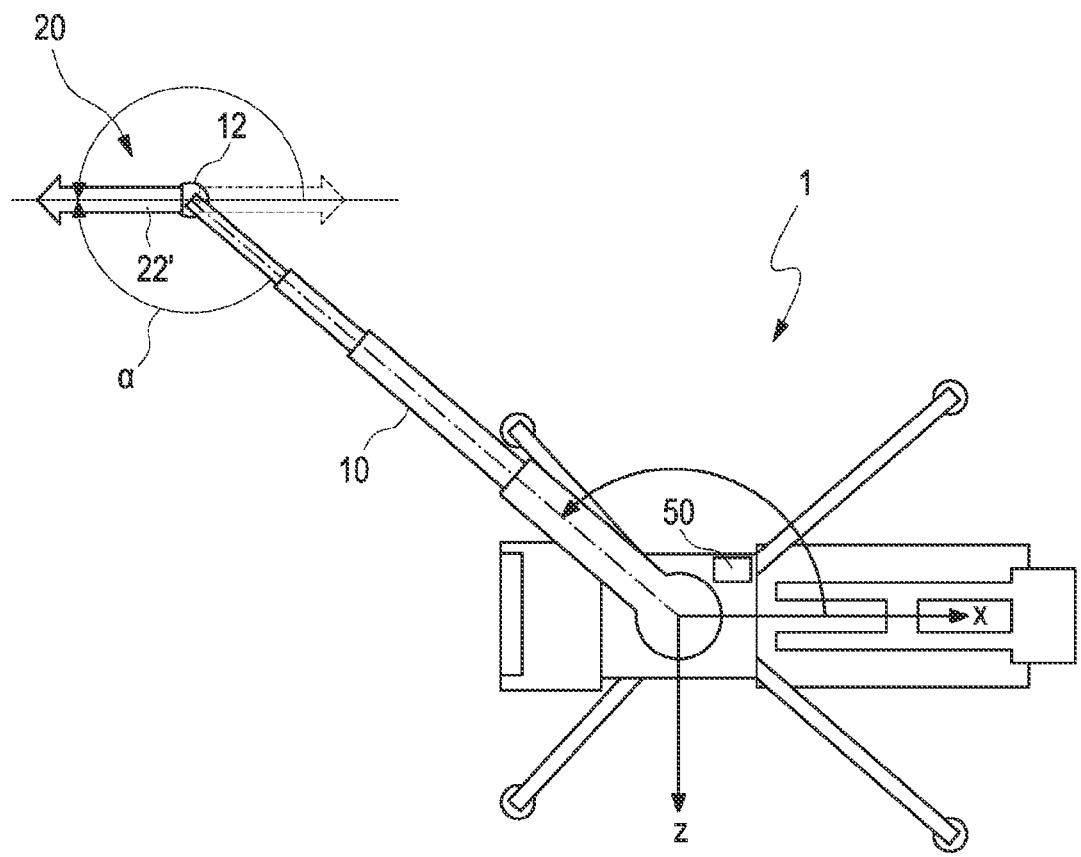
FIG. 4: shows a schematic illustration of a concrete pump having a control device according to the invention.

In FIG. 4, a truck-mounted concrete pump 1 having concrete placement boom 10 is shown from the bird's eye perspective, on the boom tip of which the end tube 12 is arranged. A display device 20 is arranged in the region of the end tube 12, which displays a predetermined direction of movement in the travel direction of the truck-mounted concrete pump 1 via display element 22'. The concrete placement boom 10 furthermore has a control device 50 for the end tube movement. The control device 50 is designed in such a way that for the end tube movement, it can send signals to the display device 20 to display a predetermined direction of movement and can receive signals with respect to a predetermined speed from an actuating device (not shown). From these items of information, the control device 50 calculates control signals for the articulated drives of the concrete placement boom 10. The articulated drives include the central slewing gear and the pivot joints between the individual boom arms. The angle α of the display device 20 is kept constant here in relation to the coordinate system of the machine (x, z).

FIGS. 5-8 show various contours 40, which can be traveled down using the method or the control device 50 for controlling the movement of the end tube 12. The control and operation are explained in more detail hereinafter.

Figure 5:
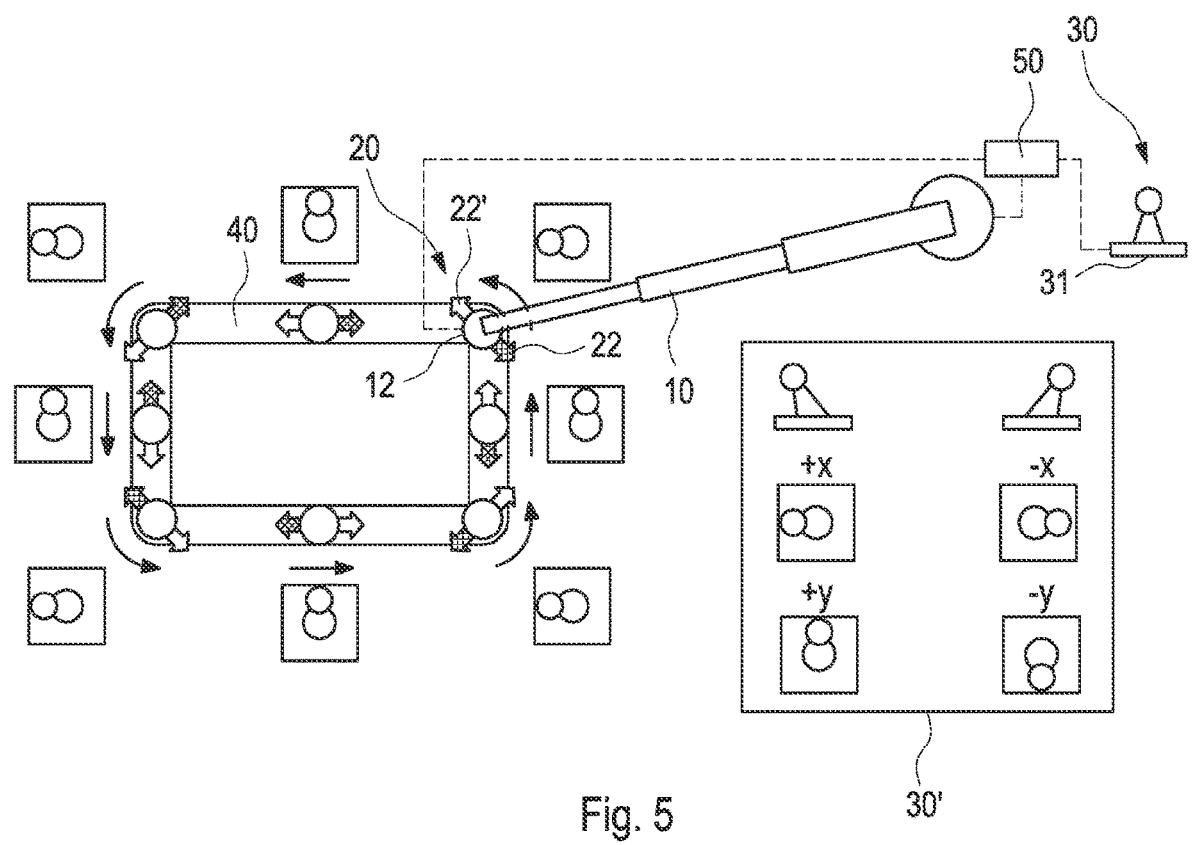
FIG. 5: shows a schematic illustration of a method according to the invention for controlling the end tube movement along a rectangular, closed contour.

In FIG. 5, the truck-mounted concrete pump 1 is indicated by the placement boom 10, at the end of which the end tube 12 is arranged. In a starting position, the end tube 12 is arranged in a top right corner of the rectangular contour 40. A display device 20 having two display elements 22, 22' is arranged in the region of the end tube 12. The display element 22' points in the predetermined direction of movement, the display element 22 points in a direction opposite to the predetermined direction of movement. In addition, an actuating device 30 designed as a remote control is shown, via which an operator can control the end tube movement by specifying a speed.

The control device 50 is designed in such a way that it interacts with the display device 20, the actuating device 30, and the placement boom 10 as described above (dashed line). On the basis of the predetermined direction according to display device 20 and the predetermined speed according to actuating device 30, the control device 50 calculates driving commands for the drive joints of the placement boom 10 in such a way that the end tube 12 can be moved, in particular linearly, along the predetermined direction of movement. The control device 50 assumes the conversion of the driving commands of an operator into driving commands for the joints of the placement boom 10.

The actuating device 30 has an operating element 31 in this embodiment. It is also conceivable that the actuating device 30 has two or more operating elements, wherein a first operating element can be assigned to the speed and a second operating element can be assigned to the direction. The control can be designed as a proportional, continuously variable one-channel or two-channel remote control (one channel for the speed, one channel for the direction).

The operating element 31 is designed as a joystick. A legend 31' shows various joystick positions of the operating element 31, which are also shown along the contour 40 to be traveled. In the first line of the legend 31', the position of the operating element 31 in the x direction is shown from the side, and in the second line, the same position of the operating element 31 in the x direction is shown from above. In a position of the operating element 31 in the +x or −x direction, the predetermined direction of movement changes. In the third line of the legend 31', the position of the operating element 31 in the y direction is shown from above. A corresponding side view was omitted, since the y direction is located perpendicular to the plane of the paper in the legend 31'. In a position of the operating element in the +y or −y direction, the end tube 12 moves in the forward or reverse direction, respectively. In this embodiment of the actuating device 30, a movement of the joystick in the x direction therefore corresponds to the "steering" and a movement in the y direction corresponds to the "driving". The functions of the operating element 31 in the x and y directions can also be exchanged, of course. The end tube 12 can be controlled as desired by the four different positions of the operating element 31 (+x, −x, +y, −y). This is explained in detail hereinafter.

Upon a deflection of the operating element 31 upward (+y), the end tube 12 moves forward, i.e., along the predetermined direction of movement 22'. Upon a deflection of the operating element 31 downward, the end tube 12 moves in reverse, i.e., against the predetermined direction of movement 22. Upon a deflection of the operating element 31 to the side (+x, −x), the predetermined direction of movement rotates to the right or left, i.e., clockwise or counterclockwise. It is possible in principle to execute the settings with the aid of two operating elements instead of one operating element 31.

In FIG. 5, the driving commands for traveling along a rectangular, closed contour 40 are shown on the basis of a predetermined direction of movement and a predetermined speed. To move the end tube 12 along the closed contour, driving commands for movement along the predetermined direction of movement (+y) and steering commands (changing the predetermined direction of movement) counterclockwise (+x) are alternately specified. A rotation of the predetermined direction of movement by 90° takes place at each of the corner points of the rectangular contour 40.

Figure 6:
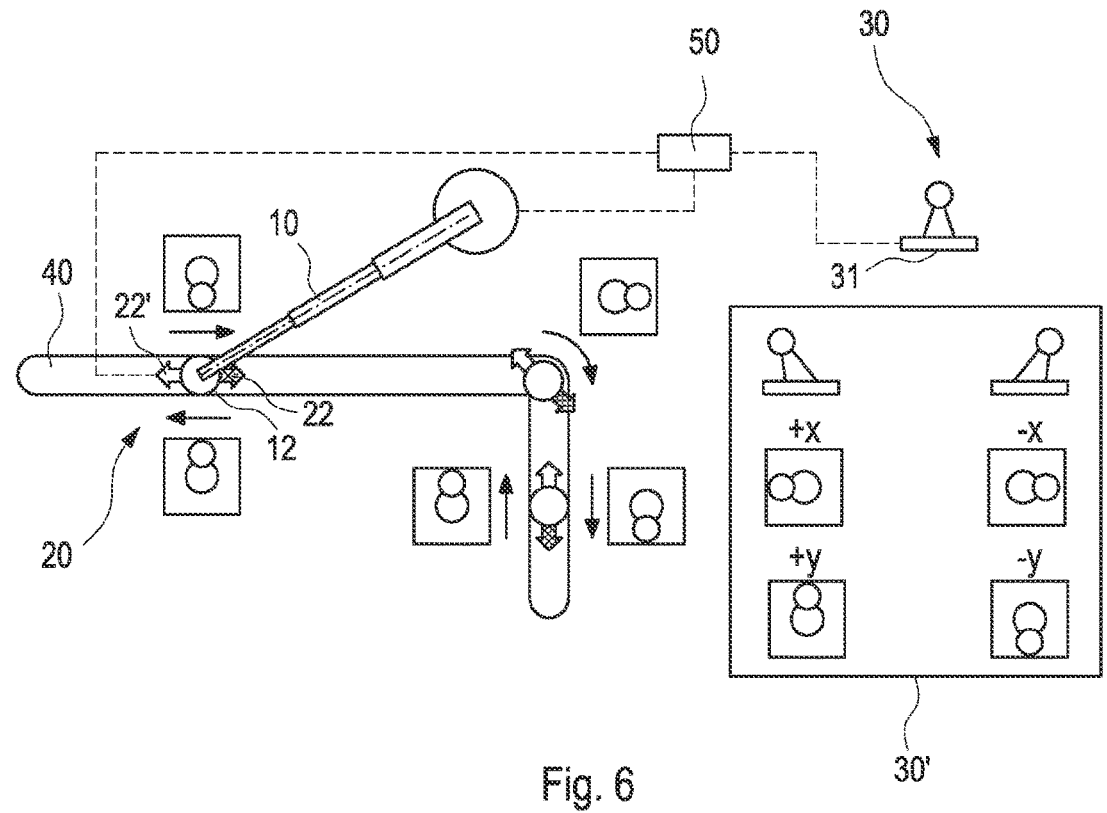
FIG. 6: shows a schematic illustration of a method according to the invention for independently controlling the direction and speed of the end tube movement along a polygonal, open contour.

In FIG. 6, the driving commands for traveling along a polygonal, open contour 40 are shown by a predetermined direction of movement and predetermined speed. The contour 40 can be traveled in the direction of the predetermined direction of movement 22' or against the predetermined direction of movement 22 and possibly back. Starting from the starting position shown (top left corner of the contour 40), the end tube 12 is first moved against the predetermined direction of movement 22 by deflecting the operating element 31 downward (−y). At the corner point of the polygonal contour 40, the end tube 12 is subsequently rotated to the right (−x) clockwise by deflecting the operating element 31. The rotational angle is 90°. By deflecting the operating element 31 downward (−y), the end tube 12 is subsequently again moved against the predetermined direction of movement 22. The return path takes place similarly by deflecting the operating element 31 upward, whereupon a movement of the end tube 12 along the predetermined direction of movement 22'. Alternatively, the predetermined direction of movement may also be rotated by 180° at the reversal point.

Figure 7:
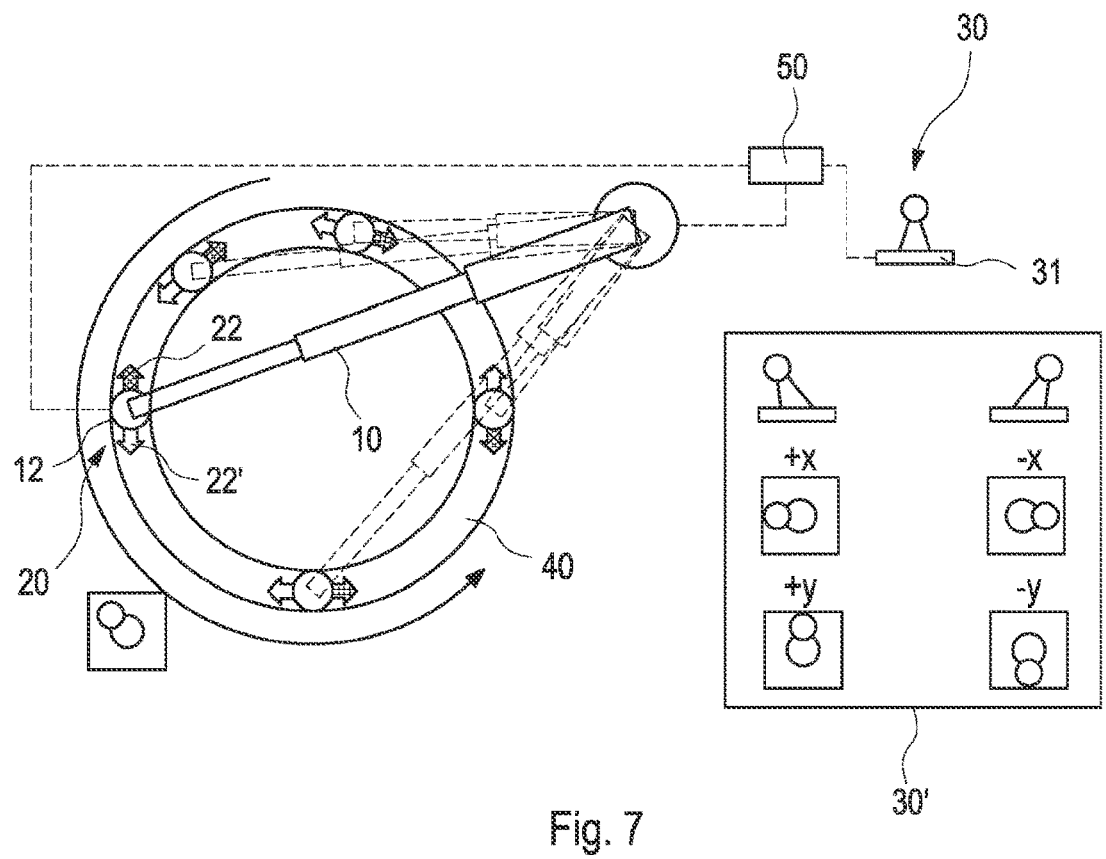
FIG. 7: shows a schematic illustration of a method according to the invention for controlling the end tube movement along a round, closed contour.

In FIG. 7, the driving commands for traveling along a round, closed contour 40 are shown on the basis of a predetermined direction of movement and a predetermined speed. The special feature during a movement along a circular path is that the steering and driving movement take place simultaneously. For this purpose, the operating element 31 is deflected forward in the driving direction (+y) and to the left (+x) for steering, which corresponds to the diagonal deflection of the operating element 31 upward to the left as shown. A movement along the circular path shown in FIG. 7 results therefrom. It is also possible upon the use of two operating elements to deflect the operating elements in the +x or +y direction, respectively.

Figure 8:
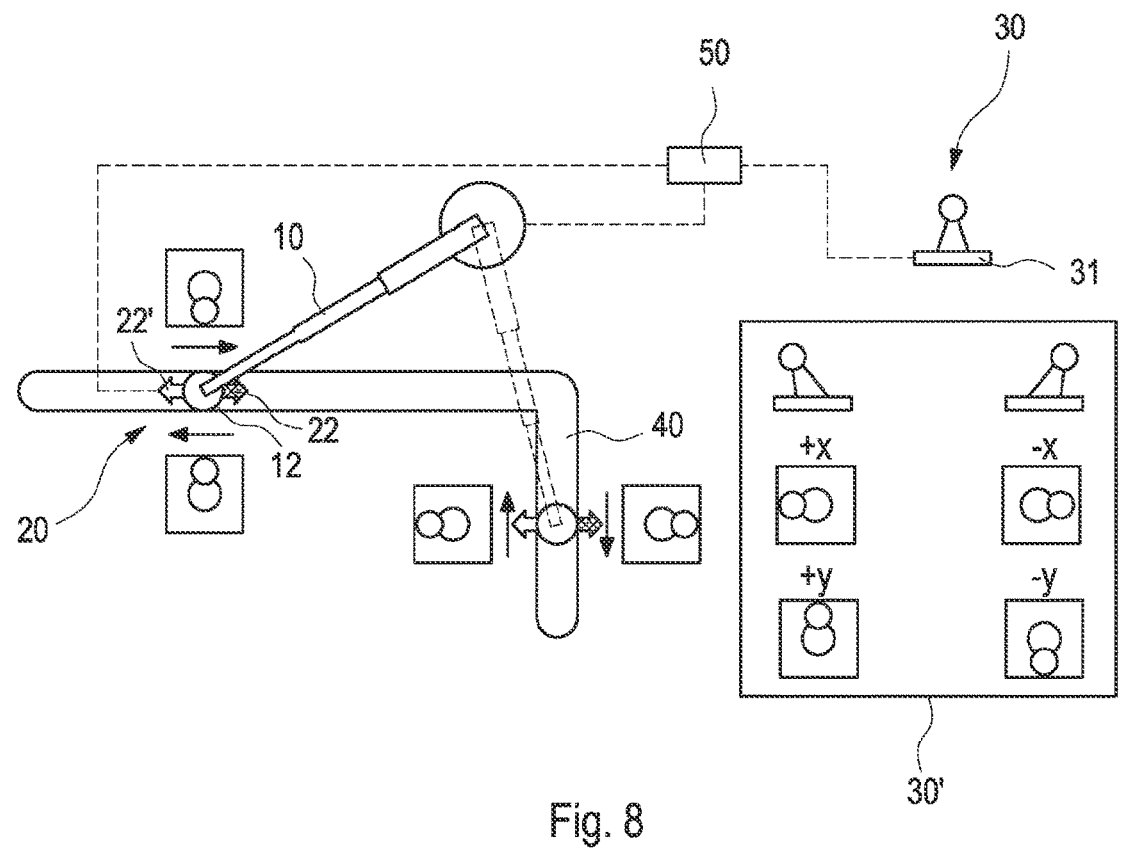
FIG. 8: shows a schematic illustration of a method according to the invention for controlling the end tube movement along a polygonal, open contour using Cartesian coordinates.

In FIG. 8, the driving commands for traveling along a polygonal, open contour 40 are shown on the basis of Cartesian coordinates. In contrast to the driving commands shown in FIG. 6 (with identical contour 40), no steering movement, i.e., change of the predetermined direction of movement, takes place. Instead, the end tube 12 is only moved in or against the predetermined direction of movement 22, 22' and perpendicularly thereto. From the starting position shown in FIG. 8, the end tube is first moved against the predetermined direction of movement 22 by deflecting the operating element 31 downward (−y) and subsequently moved perpendicularly to the predetermined direction of movement by deflecting the operating element 31 to the right (−x). The deflection of the operating elements 31 in the x or y direction, respectively, therefore corresponds to a movement in Cartesian coordinates and covers the entire two-dimensional surface (x, y). The predetermined direction of movement 22 (display element 22') thus corresponds to the y or −y direction.

Using the method or the control device 50 for controlling the movement of an end tube 12 arranged on a concrete placement boom 10 of a concrete pump 1, contours 40 of any arbitrary shape can be traveled along, in which the articulated drives of the placement boom 10 carry out complex movement sequences.

The invention claimed is:

1. A method for controlling the movement of an end tube by means of a control device, wherein the end tube is arranged on a concrete placement boom comprising the end tube and a display device configured as an LED ring having a circumference, which is mounted to the concrete placement boom in the region of the end tube and which comprises a plurality of light elements distributed about the circumference that illuminate to indicate a predetermined direction of movement of the end tube, the method comprising the following steps:
   outputting a signal to display a predetermined direction of movement to the display device,
   receiving a speed predetermined by an operator via an actuating device for moving the end tube, and
   calculating and outputting control signals to control the concrete placement boom in such a way that the end tube moves at the predetermined speed in the predetermined direction of movement,
   wherein only a speed has to be set via the actuating device to control the end tube in the predetermined direction of movement indicated by the display device.

2. The method of claim 1, wherein the end tube is moved in a straight line.

3. The method of claim 1, wherein a predetermined negative speed results in a movement of the end tube against the predetermined direction of movement.

4. The method of claim 1, wherein the calculation of the control signals for at least one articulated drive of the concrete placement boom is carried out on the basis of the predetermined direction of movement and the predetermined speed.

5. The method of claim 1, further comprising the following steps:
   receiving a changed movement direction from the actuating device, and
   transmitting a signal to display the changed movement direction of movement to the display device.

6. The method of claim 1, wherein the predetermined direction of movement corresponds to an x and y direction of a Cartesian coordinate system, wherein the end tube is located in the coordinate origin, and wherein the predetermined speed corresponds to a movement direction in the x direction, the y direction, or a combination of the x and y direction.

7. A control device for moving an end tube arranged on a concrete placement boom comprising the end tube and a display device configured as an LED ring, which is mounted to the concrete placement boom in the region of the end tube and which comprises a plurality of LEDs distributed around its circumference that illuminate to indicate a predetermined direction of movement of the end tube, wherein the control device executes computer code to carry out the following steps:
   outputting a signal to display a predetermined direction of movement to the display device,
   receiving a speed predetermined by an operator via an actuating device for moving the end tube, and
   calculating and outputting control signals to control the concrete placement boom in such a way that the end tube moves at the predetermined speed in the predetermined direction of movement; and
   wherein the control device outputs a signal to display the predetermined direction of movement on the display device which moves with the concrete placement boom and is visible to the operator during the control of the end tube movement, receives the predetermined speed for the movement of the end tube from the actuating device, and calculates and outputs control signals to control the concrete placement boom in accordance with a movement of the end tube at the predetermined speed in the predetermined direction of movement.

8. The control device of claim 7, wherein the predetermined direction of movement corresponds to an x and y direction of a Cartesian coordinate system, wherein the end tube is located in the coordinate origin, and wherein the predetermined speed corresponds to a movement direction in the x direction, the y direction or a combination of the x and y direction.

9. The control device of claim 7, wherein the control device converts the predetermined direction of movement and the predetermined speed or the x and y direction and the predetermined direction of movement in the x direction, the y direction or a combination of the x and y direction into control signals for at least one articulated drive of the concrete placement boom.

10. The control device of claim 7, which communicates with an angle encoder of an articulated drive of the concrete placement boom.

11. The control device of claim 7 incorporated into a system including the display device and the actuating device.

12. The system of claim 11, wherein the display device is arranged as a physical device on the end tube.

13. The system of claim 11, wherein the indication of the predetermined direction of movement by the LED ring is effected by simultaneous or different illumination of LEDs of the LED ring.

14. The system of claim 11, wherein the display device additionally displays a movement direction against the predetermined direction of movement or a −x and −y direction of the Cartesian coordinate system.

15. The system of claim 11, wherein the actuating device is a remote control.

16. The system of claim 11, wherein the actuating device comprises a first operating element, wherein the predetermined speed and the predetermined direction of movement are settable via the first operating element.

17. The system of claim 16, wherein one or more operating elements are a joystick.

18. The system of claim 11, wherein the actuating device comprises an operating element wherein the movement direction in the x direction, the y direction or a combination of the x and y direction can be set via the operating element, or wherein the actuating device comprises a first and second operating element wherein the speed can be set via the first operating element and the movement direction can be set via the second operating element.

19. A concrete placement boom having a control device for moving an end tube arranged on a concrete placement boom comprising the end tube, said concrete placement boom comprising:
   a display device configured as an LED ring having a circumference, which is mounted to the concrete placement boom in the region of the end tube and which comprises a plurality of light elements distributed about the circumference that illuminate to indicate a predetermined direction of movement of the end tube, and
   a control device separate from the display device, wherein the control device executes program code to carry out the following steps:
   outputting a signal to display a predetermined direction of movement on the display device,
   receiving a predetermined speed for the movement of the end tube from an actuating device, and
   calculating and outputting control signals to control the concrete placement boom in accordance with a movement of the end tube at the predetermined speed in the predetermined direction of movement; and
   an actuating device comprising a first operating element, wherein the predetermined speed and the predetermined direction of movement is settable via the first operating element.

20. The concrete placement boom of claim 19, wherein an operating mode of the control device can be changed between cylinder coordinates and Cartesian coordinates.

21. A computer program having program code for controlling the movement of an end tube arranged on the concrete placement boom of claim 19.

* * * * *